US006876514B1

(12) United States Patent
Little

(10) Patent No.: US 6,876,514 B1
(45) Date of Patent: Apr. 5, 2005

(54) DISK DRIVE INCLUDING AN AIRFLOW DIVERTER ELEMENT RADIALLY BETWEEN SPINDLE MOTOR AXIS OF ROTATION AND CAVITY IN SHROUD SURFACE

(75) Inventor: Aaron D. Little, Campbell, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 101 days.

(21) Appl. No.: 10/262,253

(22) Filed: Sep. 30, 2002

(51) Int. Cl.[7] ............................................... G11B 33/14
(52) U.S. Cl. ................................................... 360/97.02
(58) Field of Search ..................................... 360/97.02

(56) References Cited

U.S. PATENT DOCUMENTS

| 5,453,890 | A | * | 9/1995 | Takegami et al. | ......... 360/97.02 |
| 5,541,791 | A | * | 7/1996 | Yamasaki et al. | ......... 360/256.1 |
| 6,266,208 | B1 | * | 7/2001 | Voights | .................. 360/97.02 |
| 6,362,937 | B1 | | 3/2002 | Gibbe et al. | |
| 6,600,625 | B1 | | 7/2003 | Munninghoff et al. | |
| 2002/0063991 | A1 | | 5/2002 | Machcha et al. | |
| 2002/0071202 | A1 | | 6/2002 | Myokan et al. | |
| 2002/0149876 | A1 | | 10/2002 | Sakata et al. | |
| 2003/0002206 | A1 | | 1/2003 | Long et al. | |
| 2003/0156350 | A1 | * | 8/2003 | Hong et al. | .............. 360/97.02 |

* cited by examiner

*Primary Examiner*—A. J. Heinz
(74) *Attorney, Agent, or Firm*—Won Tae C. Kim, Esq.; Stetina Brunda Garred & Brucker

(57) ABSTRACT

A disk drive including a disk drive base and a cover attached to the disk drive base. The disk drive further includes a rotatable disk including a disk surface extending to an outer periphery. The disk drive further includes a spindle motor including an axis of rotation. The spindle motor is rotatably coupled to the disk drive base for rotating the disk about the axis of rotation. The disk drive further includes a shroud surface concentrically formed about and adjacent the outer periphery. The disk drive further includes a cavity formed in the shroud surface. The cavity extends to a cavity opening adjacent the outer periphery. The disk drive further includes an airflow diverter element extending from the cover towards the disk surface radially between the cavity opening and the axis of rotation for diverting disk rotation induced airflow adjacent the disk surface.

20 Claims, 4 Drawing Sheets

DISK DRIVE INCLUDING AN AIRFLOW DIVERTER ELEMENT RADIALLY BETWEEN SPINDLE MOTOR AXIS OF ROTATION AND CAVITY IN SHROUD SURFACE

BACKGROUND OF THE INVENTION

CROSS-REFERENCE TO RELATED APPLICATIONS

Not applicable.

1. Field of the Invention

The present invention relates generally to disk drives, and in particular to a disk drive including an airflow diverter element radially between a spindle motor axis of rotation and a cavity in a shroud surface.

2. Description of the Prior Art

The typical hard disk drive includes a disk drive base, and a head disk assembly (HDA) and a printed circuit board assembly (PCBA) attached to the disk drive base. The head disk assembly includes at least one magnetic disk, a spindle motor for rotating the disk, and a head stack assembly (HSA) that includes at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The spindle motor typically includes a spindle motor base, a central shaft a rotatable spindle motor hub, a stator, a magnet attached to the hub, and vertically spaced upper and lower ball bearing sets mounted upon the central shaft which facilitate rotational attachment of the hub to the spindle motor base. Each ball bearing set includes inner and outer ball bearing races, which encase a plurality of ball bearings. The inner ball bearing races engage the central shaft and the outer ball bearing races engage the hub. This configuration allows for rotational movement of the outer ball bearing races relative to the inner ball bearing races for rotation of the hub. The hub further includes an outer flange, which is used to support one or more of the disks. The upper and lower ball bearing sets are pre-loaded in compression to maintain the hub and the disks supported on the hub in an orthogonal configuration with respect to the central shaft. The stator includes a series of coils and is concentrically positioned about the central shaft, adjacent the hub. With this general configuration, the various coils of the stator are selectively energized to form an electromagnetic field that pulls/pushes on the magnet otherwise associated with the hub, thereby imparting a rotational motion onto the hub. Rotation of the hub results in the rotation of the attached disks.

A shroud is typically disposed adjacent and generally conforms to the outer periphery of the disks. The shroud includes a curved shroud surface that may be formed in the disk drive base concentrically about the disks. This shroud surface is designed to generally maintain a consistent aerodynamic environment adjacent the rotating disks during operation of the disk drive. For various reasons cavities may be formed in the shroud surface. For example, a cavity maybe used to divert disk rotation induced airflow into the cavity. The cavity may be formed as a channel that redirects airflow away from adjacent the disk outer periphery through a recirculation filter. The cavity may then direct the airflow from the filter back to the adjacent the outer disk periphery at a location downstream from where the airflow enters the cavity. Another reason a cavity may be disposed within the shroud surface is to facilitate access of tooling utilized for fabrication processes of the disk drive.

It is contemplated that such cavities or discontinuities in the shroud surface may result in airflow being directed upwards and across the upper surface of the topmost disk to adjacent the top of the spindle motor. Such airflow adjacent the top of the spindle motor, however, may have certain undesirable effects. For example, the spindle motor may have a labyrinth style cap that forms a seal between the central shat and the hub and encloses the ball bearings sets. However, the seal formed by the cap may not be optimal. As a result, airflow across the top of the spindle motor and the cap may tend to draw out particles from within the spindle motor. In this regard, there is a need in the art for an improved disk drive in comparison to the prior art.

SUMMARY OF THE INVENTION

An aspect of the present invention can be regarded as a disk drive including a disk drive base and a cover attached to the disk drive base. The disk drive further includes a rotatable disk including a disk surface extending to an outer periphery. The disk drive further includes a spindle motor including an axis of rotation. The spindle motor is rotatably coupled to the disk drive base for rotating the disk about the axis of rotation. The disk drive further includes a shroud surface concentrically formed about and adjacent the outer periphery. The disk drive further includes a cavity formed in the shroud surface. The cavity extends to a cavity opening adjacent the outer periphery. The disk drive further includes an airflow diverter element extending from the cover towards the disk surface radially between the cavity opening and the axis of rotation for diverting disk rotation induced airflow adjacent the disk surface.

According to various embodiments, the airflow diverter element may be formed of plastic, and may be adhesively attached to the cover. The disk drive may further include a disk clamp for engaging the disk to the spindle motor. The disk clamp may have a top surface disposed toward the cover and the airflow diverter element may extend toward the disk surface at least to the top surface of the disk clamp. The airflow diverter element may extend toward the disk surface beyond the top surface of the disk clamp. The airflow diverter element may be triangular shaped. The airflow diverter element may be tapered from a larger width adjacent the axis of rotation to a smaller width adjacent the cavity opening. The airflow diverter element may be sized and configured to divert disk rotation induced airflow away from the spindle motor. The disk drive may further include a filter and a filter support disposed adjacent the cavity, and the filter support may be sized and configured to support the filter within the cavity. The disk drive may further include a head stack assembly rotatably coupled to the disk drive base for reading and writing data from and to the disk, and the airflow diverter element may be disposed upstream of the head stack assembly.

DESCRIPTION OF THE PREFERRED EMBODIMENTS

Figure 1:
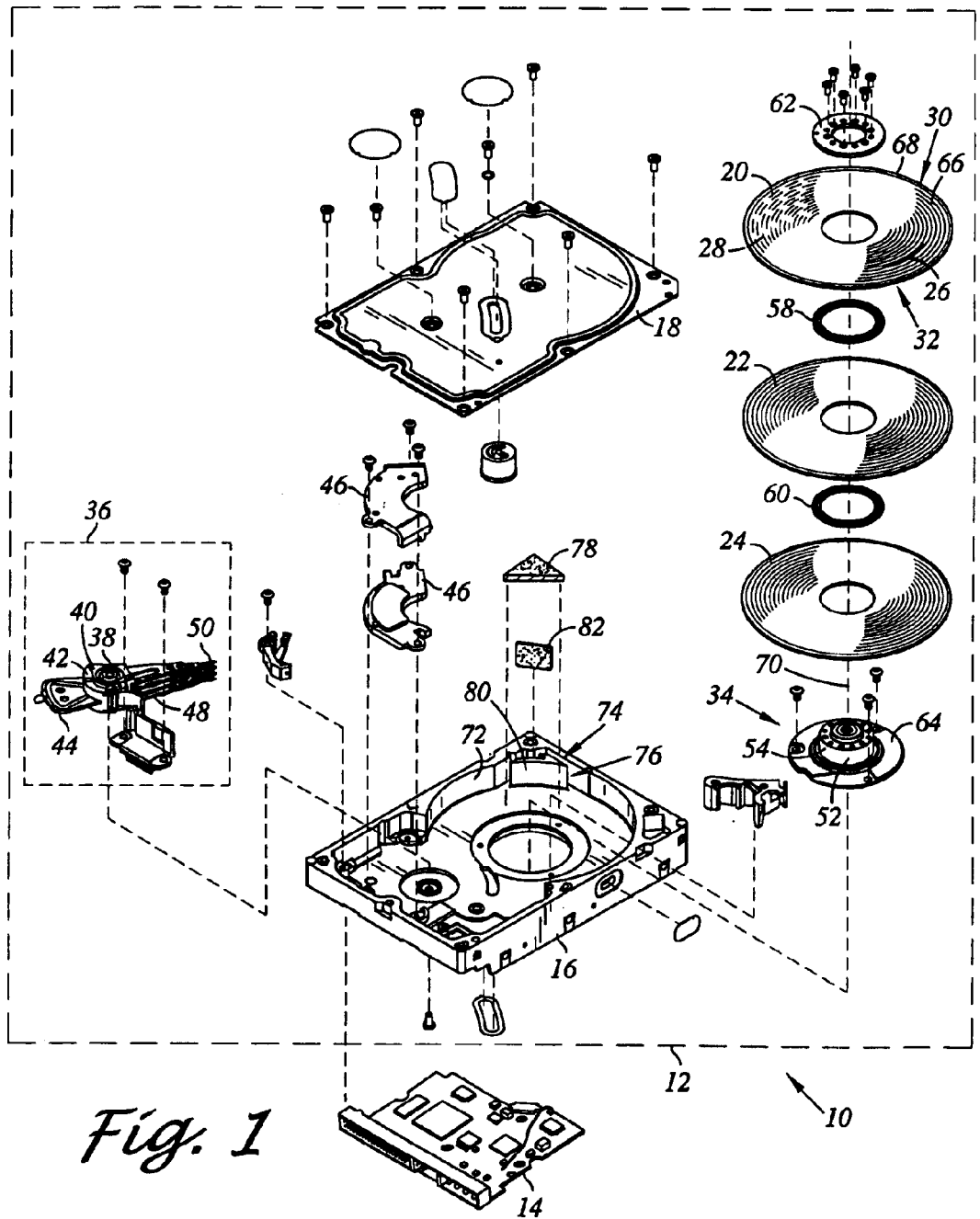
FIG. 1 is an exploded perspective view of a disk drive including an airflow diverter element as constructed in accordance with the present invention.

Referring now to the drawings wherein the showings are for purposes of illustrating preferred embodiments of the present invention only, and not for purposes of limiting the same, FIGS. 1–4 illustrate a disk drive including an airflow diverter element in accordance with the aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a housing, which may include a disk drive base 16 and a cover 18 that collectively house magnetic disks 20, 22, 24. Each magnetic disk 20, 22, 24 contains a plurality of tracks for storing data. The magnetic disks 20, 22, 24 may be two-sided, and thus for example, the magnetic disk 20 is shown having a track 26 on an upper facing side 30 and a track 28 (shown in phantom) on a lower facing side 32. The head disk assembly 12 further includes a spindle motor 34 for rotating the magnetic disks 20, 22, 24. The head disk assembly 12 further includes a head stack assembly 36 and a pivot bearing cartridge 38. The head stack assembly 36 includes a rotary actuator 40.

The rotary actuator 40 includes an actuator body 42 that has a bore and the pivot-bearing cartridge 38 is engaged within the bore for facilitating the rotary actuator 40 to rotate between limited positions. The rotary actuator 40 further includes a coil portion 44 that extends from one side of the actuator body 42 to interact with a pair of permanent magnets 46 to form a voice coil motor for pivoting the rotary actuator 40. A plurality of actuator arms, the lowermost one of which being denoted 48, extend from an opposite side of the actuator body 42. As the disks 20, 22, 24 may be two sided, each of the actuator arms include either one or two head gimbal assemblies associated with the adjacent sides of the disks 20, 22, 24. Each head gimbal assembly includes an air bearing slider or slider (the uppermost one being denoted 50). Each air bearing slider 50 is contemplated to include a transducer head for reading and writing data from and to the disks 20, 22, 24.

Figure 4:
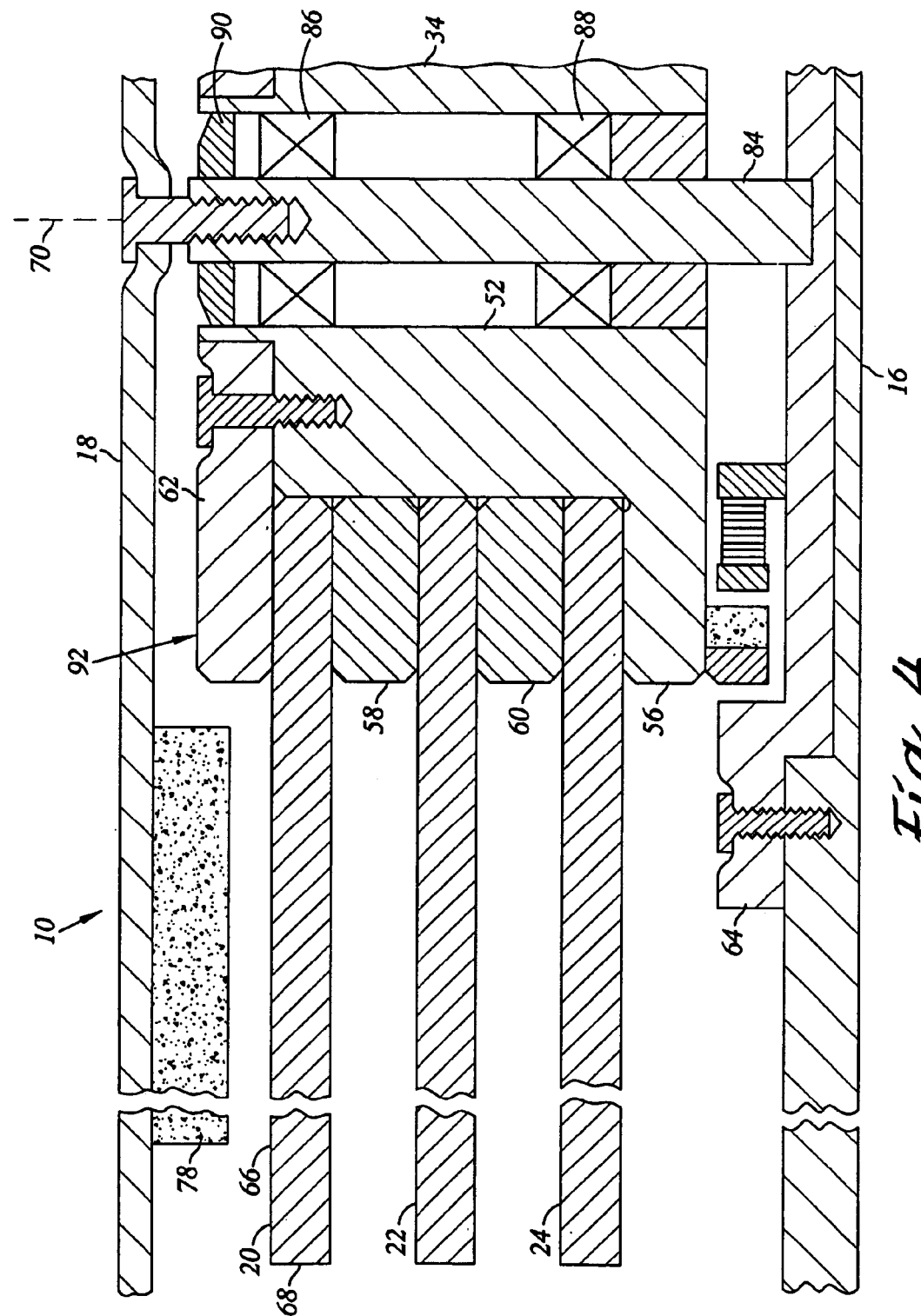
FIG. 4 is a cross-sectional view of a portion of the disk drive as seen along axis 4—4 of FIG. 3 as shown with a cover.

The spindle motor 34 includes a spindle motor hub 52 that is rotatably attached to the disk drive base 16. The spindle motor hub 52 has a hub body 54 and a hub flange 56 that extends from the hub body 54, as shown in FIG. 4. The hub flange 56 includes a supporting surface for supporting a lowermost one of the disks, namely disk 24. The remaining disks 22, 20 are stacked and separated with annular disk spacers 58, 60 that are disposed about the hub body 54. A disk clamp 62 is attached about the spindle motor hub 52 and is utilized to apply a damping force against the topmost disk 20 for securing all the disks 20, 22, 24 to the spindle motor hub 52. The spindle motor 34 may further include a spindle motor base 64 that is mounted to the disk drive base 16.

Figure 2:
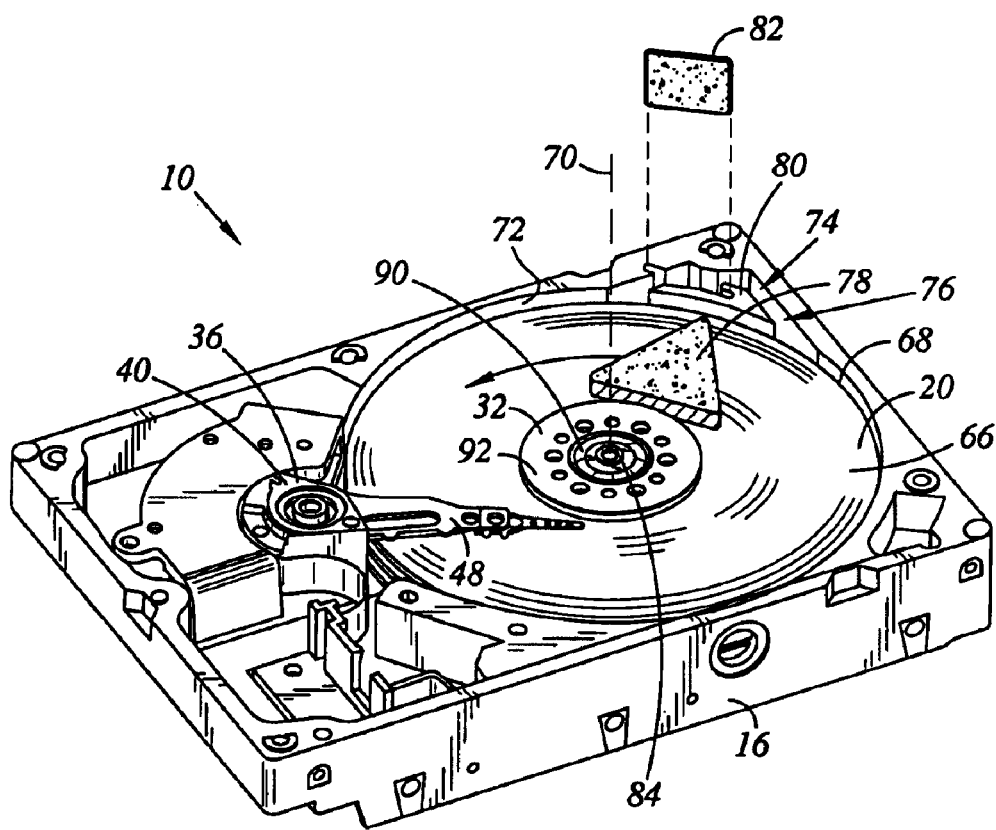
FIG. 2 is an enlarged perspective view of the disk drive of FIG. 1 as generally assembled, however, without a cover shown.
Figure 3:
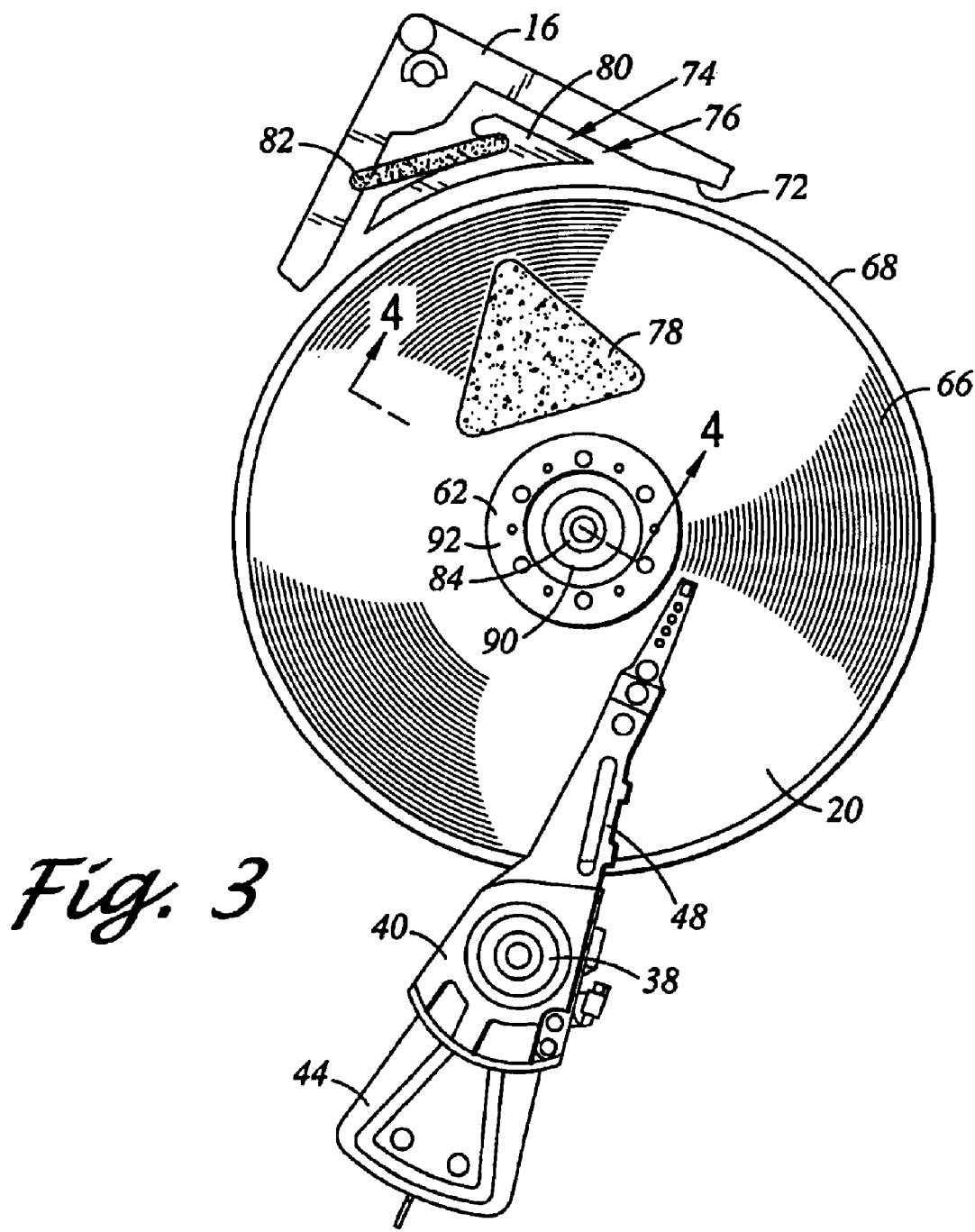
FIG. 3 is an enlarged plan view of portions of the disk drive of FIG. 2, and in particular the airflow diverter element, a disk, a head stack assembly, a portion of a disk drive base with a cavity.

Referring now additionally to FIG. 2, there is depicted an enlarged perspective view of the disk drive 10 of FIG. 1 as generally assembled, however, without a cover 18 shown. FIG. 3 is an enlarged plan view of portions of the disk drive 10 of FIG. 2. FIG. 4 is a cross-sectional view of a portion of the disk drive 10 as seen along axis 4—4 of FIG. 3 as shown with a cover 18. An aspect of the present invention can be regarded as the disk drive 10 that includes the disk drive base 16 and the cover 18 attached to the disk drive base 16. The disk drive 10 further includes a rotatable disk, such as disk 20, including a disk surface 66 extending to an outer periphery 68. The disk drive 10 further includes the spindle motor 34 including an axis of rotation 70. The spindle motor 34 is rotatably coupled to the disk drive base 16 for rotating the disk 20 about the axis of rotation 70. The disk drive 10 further includes a shroud surface 72 concentrically formed about and adjacent the outer periphery 68. The disk drive further includes a cavity 74 formed in the shroud surface 72. The cavity 74 extends to a cavity opening 76 adjacent the outer periphery 68. The disk drive 10 further includes an airflow diverter element 78 extending from the cover 18 towards the disk surface 66 radially between the cavity opening 76 and the axis of rotation 70 for diverting disk rotation induced airflow adjacent the disk surface 66.

As mentioned above, the disk drive 10 further includes a shroud surface 72 concentrically formed about the outer periphery 68. In this regard, the shroud surface 72 is curved. The shroud surface 72 need only be disposed along some portion of the disk 20 and is not required to be completely disposed all the way around the disk 20. In this regard, obviously, the shroud surface 72 does not continue along the outer periphery 68 of the disk 20 immediately adjacent the head stack assembly 36 for example.

As further mentioned above, the airflow diverter element 78 is disposed radially between the cavity opening 76 and the axis of rotation 70 for diverting disk rotation induced airflow adjacent the disk surface 66. In this regard, it is contemplated that only a portion of the airflow diverter element 78 need be disposed radially between the cavity opening 76 and the axis of rotation 70. In addition, the cavity opening 76 may be formed in the shroud surface 72 facing the outer periphery 68 as shown. The cavity opening 76 may also be disposed to face upward as in the embodiment shown.

According to various embodiments, the disk drive 10 may further include a filter support 80 and a filter 82 disposed adjacent the cavity 74. The filter support 80 may be size and configured to support the filter 82 within the cavity 74. A portion of the filter support 80 may form a portion of the shroud surface 72. In the embodiment shown, the cavity 74 is utilized to divert disk rotation induced airflow through the filter 82 and back to adjacent the outer periphery 68 downstream of where the airflow is bled off. In this regard, this filter configuration is sometimes referred to as a reciculation filter. It is contemplated that the cavity 74 may take other forms and be utilize for other functions, such as to facilitate access of tooling utilized for fabrication processes of the disk drive.

The spindle motor 34 may include a central shaft 84 and vertically spaced upper and lower ball bearing sets 86, 88 mounted upon the central shaft 84 which facilitate rotational attachment of the spindle motor hub 52 to the spindle motor base 64. A cap 90 may be used to seal the upper and lower ball bearing sets 86, 88 within the spindle motor 34 between the central shaft 84 and the spindle motor hub 52.

It is contemplated that the cavity 74 may result in airflow being directed upwards and across the disk surface 66 of the disk 20 adjacent the cap 90 of the spindle motor 34. As a result, to the extent that the cap 90 does not sufficiently form a seal, such airflow may tend to draw out particles from within the spindle motor 34. However, the inclusion of the airflow diverter element 78 may be used to divert airflow away from the spindle motor 34. In this regard it is contemplated that design selections concerning the arrangement utilized to form a seal for the spindle motor 34 may impacted by the inclusion of the airflow diverter element 78. For example, a sealing arrangement that is not completely efficient and perhaps less costly may be chosen over more efficient and possibly more costly arrangements. In this regard, it is preferable that the airflow diverter element 78 is sized and configured to divert disk rotation induced airflow away from the spindle motor 34. As best seen in FIG. 4, the disk clamp 62 may have a top surface 92 disposed toward the cover 18. The airflow diverter element 78 may extend toward the disk surface 66 at least to the top surface 92 of the disk clamp 62. Further, the airflow diverter element 78 may extend toward the disk surface 66 beyond the top surface 92 of the disk clamp 62.

The airflow diverter element 78 may be formed of various materials, such as plastic. The airflow diverter element 78 may be separately formed from the cover 18 and may be attached to the cover 18 by various means, such as being adhesively attached. In another arrangement, the airflow diverter element 78 may be integrally formed with the cover 18. Further, the airflow diverter element 78 may be formed to be various geometric configurations. In the particular embodiment shown, the airflow diverter element 78 is triangular shaped and oriented such that it is tapered from a larger width adjacent the axis of rotation 70 to a smaller width adjacent the cavity opening 76. In this regard, the airflow diverter element 78 may be sized and configured to divert disk rotation induced airflow away from the spindle motor 34.

As mentioned above, the disk drive 10 may include a head stack assembly 36. The airflow diverter element 78 may be disposed at various locations in relation to the head stack assembly 36 such as upstream of the head stack assembly 36 as shown. In this regard, the airflow diverter element 78 may additionally function to shield the head stack assembly 36 or otherwise mitigate the effects of disk rotation induced airflow upon it.

I claim:

1. A disk drive comprising:
   a disk drive base and a cover attached to the disk drive base;
   a rotatable disk including a disk surface extending to an outer periphery;
   a spindle motor including an axis of rotation, the spindle motor being rotatably coupled to the disk drive base for rotating the disk about the axis of rotation;
   a disk clamp for engaging the disk to the spindle motor, the disk clamp having a top surface disposed toward the cover;
   a shroud surface concentrically formed about and adjacent the outer periphery;
   a cavity formed in the shroud surface, the cavity extending to a cavity opening adjacent the outer periphery; and
   an airflow diverter element extending from the cover towards the disk surface radially between the cavity opening and the axis of rotation for diverting disk rotation induced airflow adjacent the disk surface, the airflow diverter element extending towards the disk surface at least to the top surface of the disk clamp.

2. The disk drive of claim 1 wherein the airflow diverter element is formed of plastic.

3. The disk drive of claim 1 wherein the airflow diverter element is adhesively attached to the cover.

4. The disk drive of claim 1 wherein the airflow diverter element extends toward the disk surface beyond the top surface of the disk clamp.

5. The disk drive of claim 1 wherein the airflow diverter element is triangular shaped.

6. The disk drive of claim 1 wherein the airflow diverter element is tapered from a larger width adjacent the axis of rotation to a smaller width adjacent the cavity opening.

7. The disk drive of claim 1 wherein the airflow diverter element is sized and configured to divert disk rotation induced airflow away from the spindle motor.

8. The disk drive of claim 1 further includes a filter support disposed adjacent the cavity, the filter support is sized and configured to support a filter within the cavity.

9. The disk drive of claim 8 further includes a filter disposed within the cavity and supported by the filter support.

10. The disk drive of claim 1 further includes a head stack assembly rotatably coupled to the disk drive base for reading and writing data from and to the disk, the airflow diverter element is disposed upstream of the head stack assembly.

11. A disk drive comprising:
    a disk drive base and a cover attached to the disk drive base;
    a rotatable disk including a disk surface extending to an outer periphery;
    a spindle motor including an axis of rotation, the spindle motor being rotatably coupled to the disk drive base for rotating the disk about the axis of rotation;
    a shroud surface concentrically formed about and adjacent the outer periphery;
    a cavity formed in the shroud surface, the cavity extending to a cavity opening adjacent the outer periphery; and
    an airflow diverter element extending from the cover towards the disk surface radially between the cavity opening and the axis of rotation for diverting disk rotation induced airflow adjacent the disk surface, the airflow diverter element being tapered from a larger width adjacent the axis of rotation to a smaller width adjacent the cavity opening.

12. The disk drive of claim 11 wherein the airflow diverter element is formed of plastic.

13. The disk drive of claim 11 wherein the airflow diverter element is adhesively attached to the cover.

14. The disk drive of claim 11 further includes a disk clamp for engaging the disk to the spindle motor, the disk clamp has a top surface disposed toward the cover, the airflow diverter element extends toward the disk surface at least to the top surface of the disk clamp.

15. The disk drive of claim 14 wherein the airflow diverter element extends toward the disk surface beyond the top surface of the disk clamp.

16. The disk drive of claim 11 wherein the airflow diverter element is triangular shaped.

17. The disk drive of claim 11 wherein the airflow diverter element is sized and configured to divert disk rotation induced airflow away from the spindle motor.

18. The disk drive of claim 11 further includes a filter support disposed adjacent the cavity, the filter support is sized and configured to support a filter within the cavity.

19. The disk drive of claim 18 further includes a filter disposed within the cavity and supported by the filter support.

20. The disk drive of claim 11 further includes a head stack assembly rotatably coupled to the disk drive base for reading and writing data from and to the disk, the airflow diverter element is disposed upstream of the head stack assembly.

* * * * *